United States Patent [19]

Squires

[11] 3,987,148
[45] Oct. 19, 1976

[54] TREATING GAS AND WETTED GRANULAR MATERIAL IN PANEL BED

[76] Inventor: Arthur M. Squires, 245 W. 104 St., New York, N.Y. 10025

[22] Filed: Sept. 19, 1974

[21] Appl. No.: 507,377

[52] U.S. Cl. .................................. 423/242; 23/284; 55/73; 210/82
[51] Int. Cl.² ........................................ B01D 53/34
[58] Field of Search .............. 23/284, 288 G, 288 S; 34/64, 65, 168–174; 55/96, 98, 282, 387, 474, 518, 73, 77–79, 84; 208/152; 210/80, 82, 84, 189, 263, 268, 269, 275, 277, 279; 423/242, 244

[56] References Cited
UNITED STATES PATENTS

| | | | |
|---|---|---|---|
| 557,177 | 3/1896 | Wilder | 210/263 |
| 921,115 | 5/1909 | Jewell | 210/269 X |
| 3,296,775 | 1/1967 | Squires | 55/98 |
| 3,368,328 | 2/1968 | Reinauer | 55/96 |
| 3,410,055 | 11/1968 | Zenz | 55/98 X |
| 3,410,056 | 11/1968 | Reinauer | 55/96 |
| 3,770,388 | 11/1973 | Zenz | 55/98 X |
| 3,854,902 | 12/1974 | Kalen | 55/98 X |

Primary Examiner—Charles N. Hart
Assistant Examiner—Robert H. Spitzer
Attorney, Agent, or Firm—Abraham A. Saffitz

[57] ABSTRACT

A panel bed fitted for puffback cleaning is arranged so that gas entry faces of the granular material in the panel bed can be wetted by a liquid. Efficiency of treatment of a gas for removal of particulate matter by filtration is improved, especially for fine particulate matter at low loading in the gas, and advantageously with use of relatively coarse granular filtration medium. The liquid may be vaporized by the gas, leaving solid dissolved or suspended in the liquid to accrete upon the granular material of the bed. The panel bed is useful for removing sulfur dioxide from combustion products by absorption by a liquid absorbent, such as a suspension of slaked lime particles in water.

14 Claims, 6 Drawing Figures

TREATING GAS AND WETTED GRANULAR MATERIAL IN PANEL BED

CROSS-REFERENCE TO RELATED APPLICATIONS

This application is related to my co-pending applications, filed on Aug. 28, 1974, numbered and entitled as follows:
1. Treating Gas and Granular Material in Panel Bed, Ser. No. 501,276
2. Filtering Dusty Gas in Panel Bed, Ser. No. 501,278
3. Countercurrent Contacting of Gas and Granular Material in Panel Bed, Ser. No. 501,277
4. Treating Gas and Fine Granular Material in Panel Bed, Ser. No. 501,275

The instant application is also related to my co-pending applications, filed simultaneously herewith, numbered and entitled as follows:
5. Electrostatic Filtration in Panel Bed, Ser. No. 507,387
6. Precoating Panel Bed for Filtering Aerosol of Micron-Size Particulates, Ser. No. 507,403
7. Treating Gas with Chemically Reactive Dust in Panel Bed, Ser. No. 507,286
8. Treating Gas with Catalytic Dust in Panel Bed, Ser. No. 507,385
9. Solid-Gas Heat Exchange in Countercurrent Contacting of Gas and Granular Material in Panel Bed, Ser. No. 507,398
11. Treating Liquid and Granular Material in Panel Bed, Ser. No. 507,376

The instant application is the tenth of this sequence.

FIELD OF THE INVENTION

The invention relates to the physical or chemical treatment of at least one of a gas and a liquid and a solid granular material through bringing the materials into intimate contact.

In one of its aspects, the invention relates to an improved method and apparatus for filtering dust from a gas.

In another of its aspects, the invention relates to removing a gaseous species from a gas, such as sulfur dioxide from combustion product gas, by its absorption by a liquid absorbent, while at the same time removing particulate matter from the gas by filtration.

In yet another aspect, the invention relates to the vaporizing of a liquid such as water from a dissolved solid such as a radioactive salt to accrete the solid upon spherules of the solid, providing the solid in a form advantageous for disposal.

DESCRIPTION OF THE PRIOR ART

My aforementioned co-pending application number 1, "Treating Gas and Granular Material in Panel Bed", furnishes a review of prior art relating to panel beds, with emphasis upon art relating to techniques for removing spent granular material, together with filtered dust if any is present, from fluid entry surfaces of such panels. I incorporate this review in the instant application by reference.

My earlier U.S. Pat. No. 3,296,775 (Jan. 10, 1967) taught a reverse surge flow of gas across a panel bed to produce a movement of the granular material in a mass toward the outer edges of louvers supporting gas entry faces, effecting a spill of the material from each face, and removing filter cake if present. The surge flow was to peak sharply to a flow substantially above the minimum steady flow rate at which a steady reverse flow of gas just causes motion of the granular material, and thereafter was to decline substantially immediately.

My aforementioned co-pending application number 1, "Treating Gas and Granular Material in Panel Bed", provides a more particular characterization of a reverse transient flow of gas (i.e., puffback) to produce a movement of granular material in mass (a "body movement") toward the gas entry faces of a panel bed.

My aforementioned co-pending application number 2, "Filtering Dusty Gas in Improved Panel Bed", provides an improved chevron louver for support of gas entry faces of a panel bed, with the advantage that filtered dust penetrating the bed is not dragged downward in the general motion of solid in the panel bed that follows puffback cleaning.

My aforementioned co-pending application number 3, "Countercurrent Contacting of Gas and Granular Material in Panel Bed", provides an improved gently curved louver that promotes countercurrenticity of contacting between gas and solid treated in a panel bed.

The aforementioned co-pending application number 4, Ser. No. 501,275, disclosed an arrangement advantageous for retaining relatively fine granular material in a panel bed fitted for cleaning by puffback while at the same time using relatively high gas velocities into the face of the panel, such as could blow away the fine material if it were not properly retained. In the disclosed arrangement, the gas exit portions of the panel bed are retained by a column of closely spaced louvers. A second bed of a coarser, preferably denser granular solid is placed next to this column. The second bed is retained between the column of closely spaced louvers and a perforate wall spaced apart from the column. Gas exiting from the primary panel bed traverses the second bed. Although some leakage of the finer granular material into the coarser second bed may occur, substantially none of the finer granular material passes altogether through the coarser second bed, to be carried away by gas leaving the second bed. An important feature of the arrangement is that the spacing of the closely spaced louvers is approximately the dimensions of the coarser particles of the second bed, so that these particles do not participate in the body movement of the finer granular material when the panel bed is cleaned by puffback, i.e., so that the coarser particles do not penetrate into the panel bed of finer granular material during puffback cleaning and renewal of the finer material.

GENERAL DESCRIPTION OF THE INVENTION

I have discovered that the treatment of a gas in a panel bed fitted for cyclic cleaning or renewal through application of the reverse transient flow of gas specified in my aforementioned co-pending application number 1 can sometimes be improved by wetting the gas entry faces of the panel bed by a liquid.

Filtration efficiency is improved if the treatment involves separation and accumulation of particulate matter in the gas at the gas entry faces.

A chemical species may be absorbed from the gas by providing as wetting liquid a material absorbent toward the species.

Solid solutions or suspensions may be concentrated or the liquid therein vaporized to deposit the solid.

OBJECTS OF THE INVENTION

An object of the invention is to provide an improved method and apparatus for chemical or physical treatment of a gas and liquid and granular material by bringing them into intimate contact.

Another object of the invention is to provide an improved panel bed for filtering a dusty gas in which filtration efficiency is improved by wetting the gas entry faces of the panel bed.

Another object is to provide a panel bed for filtering a dusty gas by a granular material of exceptionally large particle size affording low pressure drop in the gas.

Another object is to provide an improved panel bed filter of high gas-filtering capacity and low pressure drop.

Another object is to provide an improved method and apparatus for removing sulfur dioxide from a gas.

Another object is to provide an improved panel bed for removing both sulfur dioxide and particulate matter from a gas such as a combustion product or smelter offgas.

Another object is to provide a method for drying a solution or suspension of a solid.

Another object is to provide a method for drying a solution or suspension of a waste solid for convenient disposal of the solid.

Another object is to provide a method for drying a solution or suspension of a solid with accretion of the solid upon spherules of the solid.

Another object is to provide a method for drying a solution or suspension of radioactive solid matter for disposal.

SUMMARY OF THE METHOD FEATURES OF THE INVENTION

My invention relates to an improved method of contacting gas, liquid, and granular material with each other to effect physical or chemical treatment of at least one of them. Granular material is arranged in a bed having a plurality of transversely disposed, upwardly spaced, gas entry portions separated by interposed supporting members having outer and inner edges. The gas entry portions have gas entry faces that are substantially contiguous with these outer edges, and a liquid is supplied to wet the gas entry faces. The bed has exit portions spaced horizontally apart from the inner edges. A gas is caused to flow forwardly in a substantially continuing flow during the aforementioned treatment through the gas entry portions and outwardly from the gas exit portions. Thereafter, a transient flow of gas is caused to move in the direction in reverse to the aforementioned flow of gas. The transient reverse flow produces first a rise (at a given rate of rise) and subsequently a fall in the pressure difference between the gas exit portions and the gas entry portions of the bed. This difference should remain greater than a first critical minimum difference for a time interval of less than about 150 milliseconds, this first critical minimum difference being that difference at which a steady flow of gas in the aforementioned reverse direction just produces a localized spill of granular material from the gas entry faces of the bed. The pressure difference produced by the transient reverse flow should peak to a top value beyond a second critical minimum difference, which is the pressure difference at which a transient flow of gas in the reverse direction, producing the second critical minimum difference at the aforementioned given rate of rise, just initiates a body movement of the granular material toward the gas entry faces to remove a portion of the granular material from the bed. The second critical minimum difference depends upon the rate of rise in the pressure difference, being larger the more rapid the rise.

For convenience of reference, I use the term puffback for the specified reverse transient flow of gas and the term puffback cleaning to denote the operation whereby granular material is spilled from the gas entry portions of the panel bed.

The method of the invention is especially useful for separating and removing particulate material from a gas.

The method is also especially useful for removing sulfur dioxide from a gas by wetting the gas entry faces with a water solution or suspension of a constituent causing the solution or suspension to be chemically absorptive toward sulfur dioxide.

The two applications just described may be usefully combined to remove both sulfur dioxide and particulate material from many important industrial waste gases, such as the product of combustion of a fuel containing sulfur and gases from the roasting or smelting of a sulfide ore.

The method is useful for using the heat in a warm but not especially hot gas, such as a gas at a temperature between about 200° and 500°F, to vaporize water from a solution or suspension of a solid. This procedure is more particularly useful for drying a waste solid for convenient disposal, such as, especially, a radioactive solid difficult to dispose of when present in a dilute water solution. The method of the invention can convert the dissolved radioactive solid into a solid residue safe for disposal into storage that may conveniently be kept under observation for a long period of time.

Sometimes it is advantageous to accrete the solid residue upon itself. Spherules of the solid are supplied as granular material to the panel bed, and spherules at and near the gas entry faces grow larger by accretion of deposited solid residue from the drying of the solution.

SUMMARY OF THE APPARATUS FEATURES OF THE INVENTION

My invention also relates to an improved gas-liquid-solid contactor with a pair of upwardly extending, horizontally spaced-apart perforate retaining walls, with means for supplying a loose solid particulate material into the space between the walls. There is a plurality of particulate-material support members each adjacent a perforation of the first perforate wall, each member being arranged to extend outwardly from below its adjacent perforation and into an inlet compartment in communication with the perforations of the first wall. A gas outlet compartment is in communication with the perforations of the second perforate wall. There is an inlet for admitting gas into the inlet compartment, and an outlet for removing gas from the outlet compartment. The support members are arranged cooperatively to support the particulate material and retain the material within the aforementioned space and to support and expose to the inlet compartment a plurality of free surfaces of the particulate material. There are means for wetting the free surfaces with a liquid. Means are provided for periodically effecting a body movement of the particulate material toward the inlet compartment of at least those portions of the particulate material including the free surfaces and which are retained on the support members. The body movement means comprises means for effecting a transient flow of gas from gas outlet compartment to gas inlet compartment that produces first a rise and subsequently a fall in the pressure difference between the gas outlet compartment and the gas inlet compartment, the pressure difference remaining greater than the aforementioned first critical minimum difference for less than about 150 milliseconds. The pressure difference also should peak to a top value beyond the aforementioned second critical minimum difference.

A typical support member for an application filtering dust from a gas advantageously has two surfaces articulated at an edge joint substantially adjacent and below the member's respective perforation. The lower of the two surfaces is arranged to extend outwardly and downwardly from the edge joint and into the inlet compartment, and the upper of the two surfaces is arranged to extend outwardly and upwardly from the edge joint and into the inlet compartment. A line drawn through the outer edge of a typical lower surface and the edge joint of the next subjacent member forms an angle less than about 60° from the horizontal.

In a support member of this design, a preferred means for wetting the free surfaces are means for allowing liquid to weep through perforations arranged to communicate between the gas inlet compartment and a space formed by the two aforementioned surfaces and a third surface lying generally between the outer edges of these two surfaces and articulating with the upper surface in an edge joint at its outer edge. The perforations are in either the lower or the third surface, and means are provided for conducting a liquid into the aforementioned space enclosed by the three surfaces.

In another design that is sometimes advantageous, especially where countercurrenticity of gas-solid contacting is desired, a typical support member is arranged to extend outwardly and downwardly in a gentle curve from below its adjacent perforation and then to extend further in a gentle curve upwardly and into the inlet compartment. The inner edge of the typical support member is either above the inner edge of the free surface supported by the member or, when below, a line drawn through these edges is inclined at an angle of less than about 45° to the horizontal.

In some instances, especially where a corrosive liquid must be handled, or where the liquid carries solid particulate matter in suspension, the means for wetting the free surfaces advantageously comprise a plurality of spray nozzles mounted in the inlet compartment and arranged to spray liquid upon the free surfaces.

BRIEF DESCRIPTION OF THE DRAWINGS

The invention will be more particularly described in conjunction with the following drawings wherein.

DESCRIPTION OF THE PREFERRED EMBODIMENTS

Figure 1:
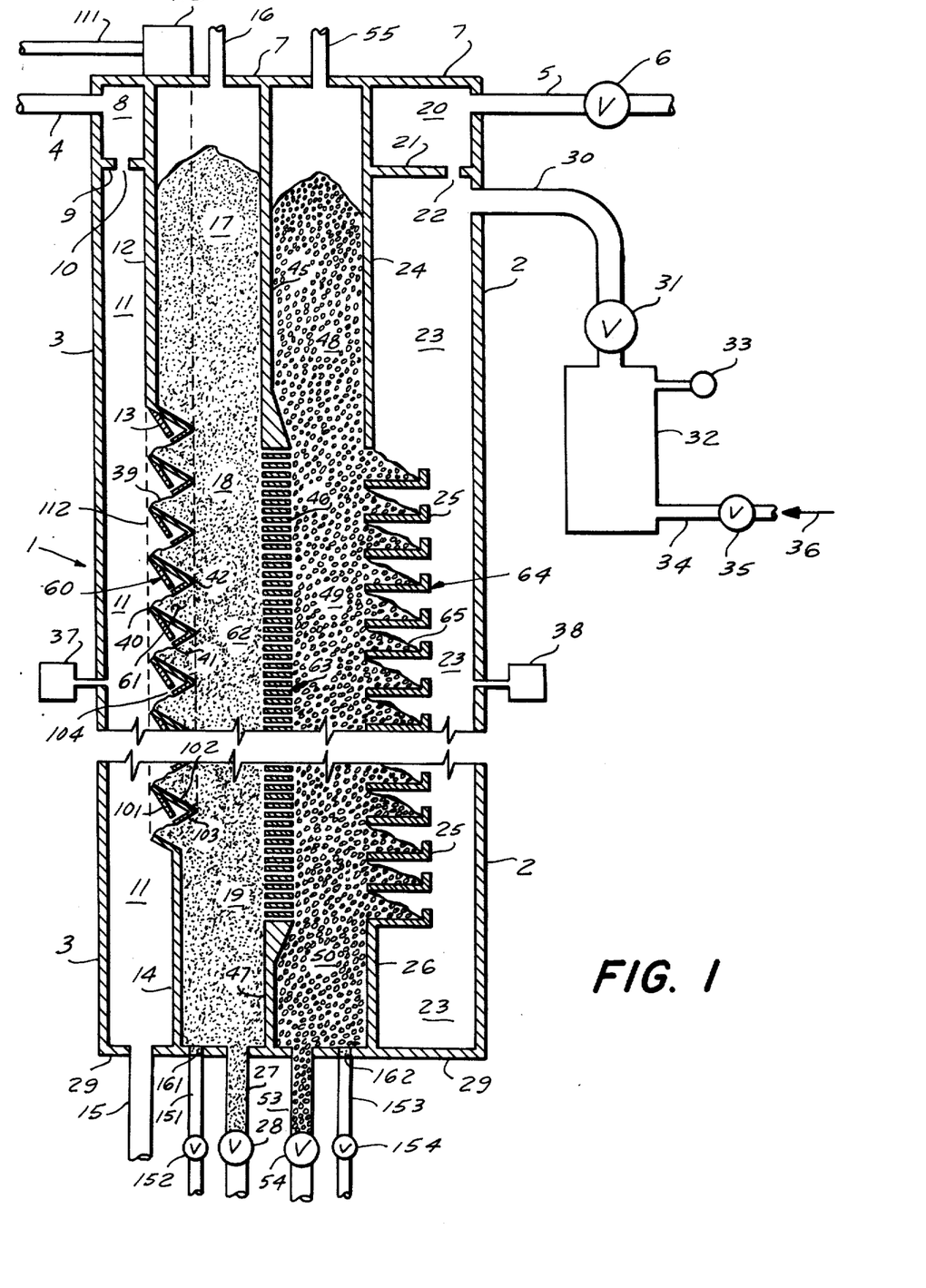
FIG. 1 is a vertical section view of a preferred contacting panel, with a bed of sand.

In the several figures, like reference numerals refer to like parts having like functions. In FIG. 1, the panel bed gas-liquid-solid contactor 1 comprises a casing of rectangular cross-section having opposed side walls 2 and 3 and top plate 7 and bottom plate 29. Opposed edge walls 51 and 52 are to be seen in FIG. 2, a top view. A generally vertical bed of granular material 18 is within the casing and retained by vertically extending, horizontally spaced-apart, perforate walls 60 and 63. Granular material is supplied by gravity feed to bed 18 from supply bed 17, retained between imperforate walls 12 and 45. Additional granular material may be added to bed 17 from pipe 16. Granular bed 18 may be drained, if desired, via space 19 between walls 14 and 47, normally filled with static granular material, by means of pipe 27 and valve 28. Perforate wall 63 comprises a series of horizontal louvers or slats 46 mounted one above another in a structure resembling subway grating and narrowly spaced apart in the vertical direction. Horizontally spaced-apart from wall 63 is a perforate wall 64 comprising a series of generally horizontal louvers or slats 25 also mounted one above another. Granular material bed 49, comprising material considerably coarser in size than the material of bed 18, is retained by perforate walls 63 and 64, and is supplied from supply bed 48, retained between imperforate walls 45 and 24. Additional granular material of the coarser character may be added to bed 48 from pipe 55. Granular bed 49 may be drained, if desired, via space 50 between walls 47 and 26, normally filled with static granular material, by means of pipe 53 and valve 54. Walls 12, 60, 14, 3, 51, and 52, bottom 29, and partition 9 enclose gas entry compartment 11, to which gas to be contacted is supplied from pipe 4 via plenum space 8 and slot 10 in partition 9 (the slot 10 preferably extending from wall 51 to wall 52). Walls 24, 64, 26, 2, 51, and 52, bottom 29, and partition 21 enclose gas exit compartment 23, from which gas leaves via slot 22 in partition 21 (the slot 22 preferably running from wall 51 to wall 52) via plenum space 20 to pipe 5. Louvers 25 cooperate to support gas exit surfaces 65 of bed 49.

Figures 2, 3:
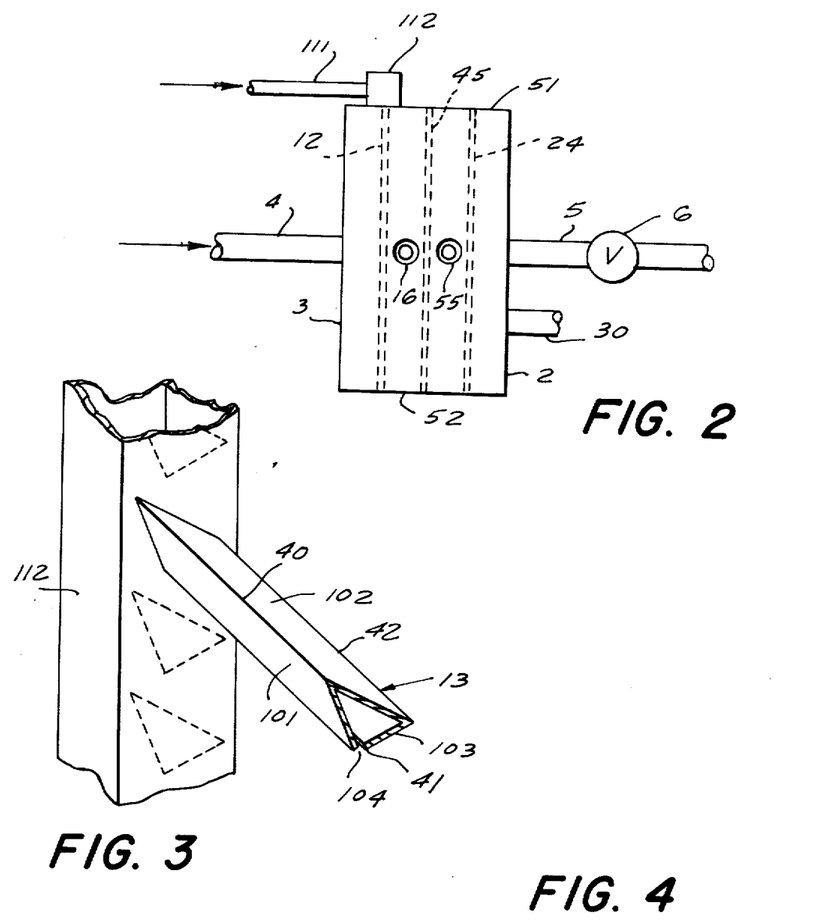
FIG. 2 is a top view of the panel bed of FIG. 1.
FIG. 3 is a cutaway view of a small portion of the panel bed of FIG. 1 showing how a liquid may be conducted to perforations where it weeps onto gas entry surfaces of the bed of sand.

Perforate wall 60 comprises a series of members 13. A typical member 13, seen in a cutaway view in FIG. 3, has cooperating surfaces 101, 102, and 103. Upper surface 102 has an outer edge 40 and an inner edge 42 in respect to granular bed 18. Lower surface 103 has an outer edge 41 and an inner edge 42, these two surfaces being articulated together at an edge joint at their common inner edges 42. Surface 101 lies generally between the outer edges 40 and 41 of surfaces 102 and 103 respectively, and articulates with upper surface 102 at an edge joint at edge 40. Between surface 101 and edge 41 of surface 103 is a narrow opening 104 running along the length of edge 41, substantially from wall 51 to wall 52. The perforations of wall 60 are to be considered as being formed between respective inner edge joints 42 of adjacent members 13. The space enclosed by surfaces 101, 102, and 103 communicates with duct 112 arranged vertically along wall 51 and supplied with a liquid from pipe 111. A cutaway view of duct 112 is seen in FIG. 3 with one member 13 in position and dashed lines indicating positions for other members 13. Members 13 are arranged cooperatively to support gas entry portions 61 of bed 18, viz., the angle of a line drawn through edge 41 of a given member and edge 40 of the next subjacent member should preferably be less than about 25° from the horizontal, an angle less than the angle of repose of most granular materials that might preferably be employed in bed 18. It will be seen that the gas entry portions 61 are transversely disposed, upwardly spaced, and separated by the interposed supporting members 13, the gas entry portions having gas entry faces 39 that are substantially contiguous with outer edges 40. A line drawn through edge 41 of a typical member 13 and edge joint 42 of the subjacent member 13 is inclined at an angle less than about 60° from the horizontal.

Gas exit portions of bed 18 are seen at 62 in FIG. 1, and are spaced from edge joints 42.

Pipe 30 connects gas exit compartment 23 with tank 32, quick-opening valve 31 being provided to isolate tank 32 from space 23. Tank 32 is connected to source 36 of gas under pressure via line 34 and valve 35. Pressure gauge 33 is provided to help adjust the pressure of gas in tank 32.

Figure 5:
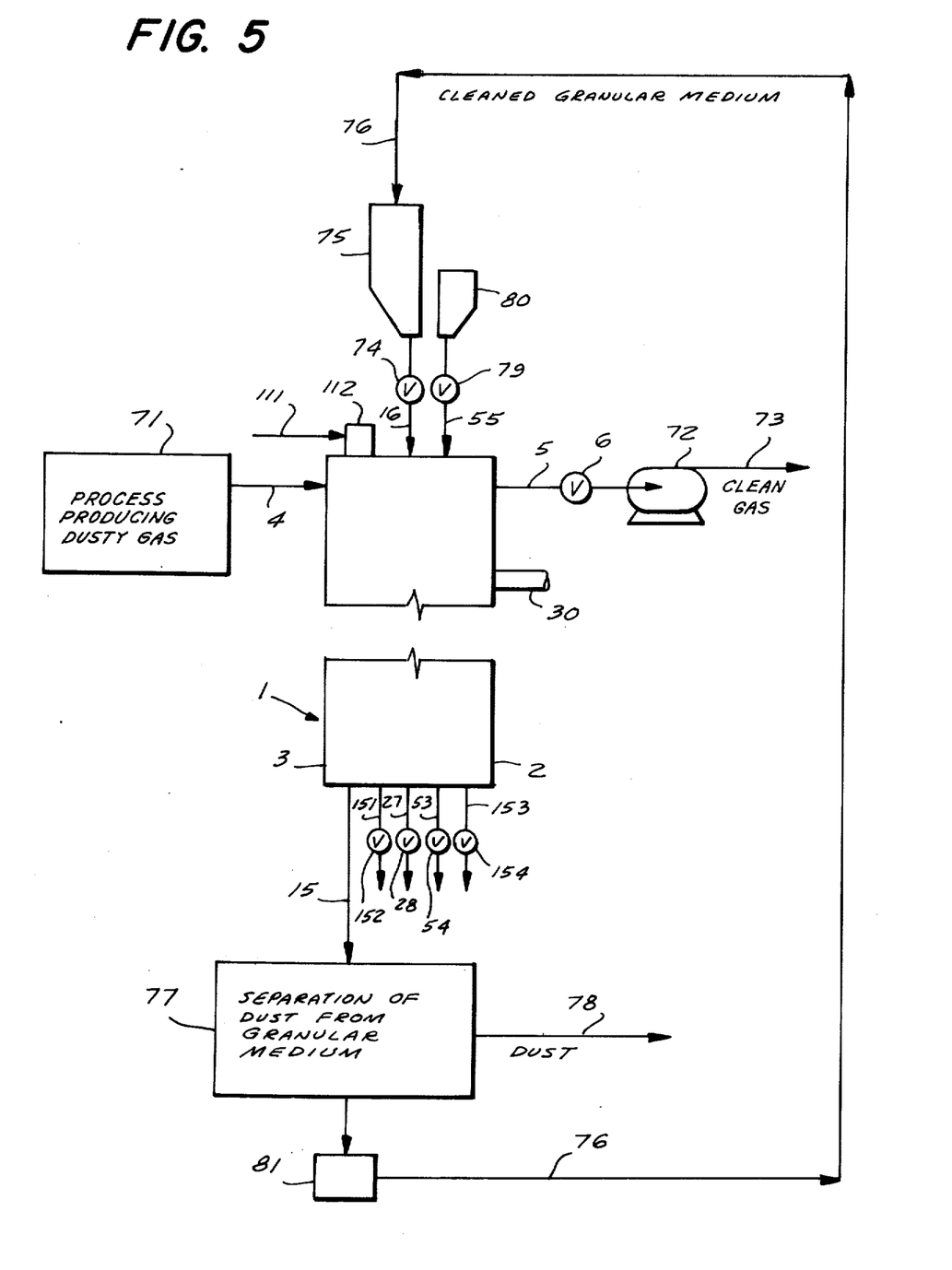
FIG. 5 is a schematic diagram illustrating use of the invention to filter a dusty gas.

In operation of panel bed filter 1, the panel bed 1 is initially charged with granular material, such as quartz sand, from line 16, filling spaces 19, 18, and 17 as shown in FIG. 1. Spaces 48, 49, and 50 are filled with a second, coarser granular material. Panel bed 1 is connected to a process supplying gas to be treated, such as process 71 producing a dusty gas to be filtered, seen in FIG. 5, via gas-entry pipe 4, and the gas is caused to flow forwardly through panel bed 1 by opening valve 6 in pipe 5. Valve 6 is preferably opened slowly so that a sudden surge of gas across gas entry faces 39 does not cause a body movement of bed 18 with compaction of the bed such as would cause an undesirable shift inward of gas entry faces 39. If process 71 does not supply gas at sufficient pressure to cause the gas to flow readily through panel bed 1, optional blower 72 is conveniently provided to carry gas from pipe 5 to line 73 for conducting clean gas from the system. A liquid is supplied to duct 112 from pipe 111, and the liquid flows in duct 112 by gravity to enter the spaces enclosed by surfaces 101, 102, and 103 of the several members 13. Liquid weeps from the space onto a gas entry face 39 through opening 104, wetting the face. The liquid is suitably water if the application illustrated in FIG. 5 for filtering dust from a gas. Periodically, tank 32 is filled with gas at pressure from supply 36, valve 35 is closed, valve 6 is closed to interrupt the flow of gas being filtered, and valve 31 is opened quickly to produce the specified transient reverse flow from compartment 23 to compartment 11. Pipe 15 is provided to withdraw dust that has accumulated at gas entry faces 39 and granular filter material spilled from surfaces 39. As seen in FIG. 5, pipe 15 advantageously conducts the spilled solids to means 77 for separating dust and granular medium, for example, by screening or elutriating the dust away from the granular medium. Pipe 78 is provided for withdrawal of dust from means 77. Optional means 81 is provided to dry the granular material if it was not dried while it was in place in bed 18 by evaporation of the liquid by the gas being filtered. Pipe 76 is provided for return of dry granular medium to supply hopper 75, from which the medium may be returned to panel bed 1 via valve 74 and pipe 16. Supply hopper 80 may conveniently be provided to hold the aforementioned coarser granular material in readiness for supply to spaces 48, 49, and 50 via valve 79 and pipe 55. After a few seconds for dust to settle to the bottom of compartment 11, valve 31 is closed, and valve 6 is opened to resume filtration by the freshly cleaned and renewed bed 18.

Pipes 151 and 153 (seen in FIG. 1) are provided to conduct excess liquid from the bottom of spaces 19 and 50 respectively, should such liquid enter these spaces. Porous plugs 161 and 162 are provided to prevent solid from entering pipes 151 and 153 respectively, and the flow in the two pipes is governed by valves 152 and 154 respectively.

Transducers 37 and 38, seen in FIG. 1, are conveniently provided in a test to determine the aforementioned first and second critical minimum pressure differences between space 23 and space 11, although competent fluid dynamicists will be able to calculate instantaneous pressure difference versus time in a test of puffback, given the porosity of beds 18 and 49, the size of valve 31, the speed of its opening, the size of tank 32, the pressure therein, the length and the diameter of line 30, and the dimensions of compartment 23. Tests for determining the critical pressure differences and illustrating the suitable limits on the time interval during which the puffback maintains the reverse pressure difference above the first critical minimum difference are discussed more fully in the aforementioned co-pending application number 1, "Treating Gas and Granular Material in Panel Bed", together with representative data, and this discussion is incorporated herein by reference. In brief, a time interval of about 150 milliseconds represents an approximate upper limit for acceptable performance, beyond which spills from individual gas entry surfaces 39 are badly distributed, there being far more spill from surfaces near the top of a panel like that seen in FIG. 1 than from surfaces near the bottom, and beyond which spills also partake disadvantageously more of the character of a localized spill and less of the character of the preferred body movement. A practical minimum time interval for operation of the arrangement of FIG. 1 appears to be about 3 to 5 milliseconds, given the practical requirement that space 23 must be large enough to accommodate a flow of gas leaving wall 64. It should be noted, however, that one might, for example, achieve an extremely short, but nevertheless non-zero, time interval by mounting a large number of blank cartridges on wall 2 and by firing them simultaneously to discharge gas explosively into space 23; or one might provide an arrangement whereby wall 2 might be displaced almost instantaneously toward wall 64 and then returned to its normal operating position.

Immediately after the puffback, the granular material of bed 18 moves downward to make good losses of material from the gas entry faces 39. The above-specified angle of less than about 60° ensures that granular material a short distance inward from edge 41 will not participate in the downward movement, carrying down with it any dust that may have penetrated this short distance into bed 18, because a line drawn through a given edge joint 42 and passing upward and outward (i.e., leftward in FIG. 1) at the angle of the failure plane of the granular material (generally between about 65° and 70° for most material that might advantageously be used) will strike the lower surface of the next superjacent member at a point inward from edge 41 of this member.

The spacing of louvers 46 in wall 63 is preferably comparable to the dimensions of the granular solid present in bed 49, so that this solid does not participate in the mass movement brought about by puffback, thereby penetrating bed 18.

Figure 4:
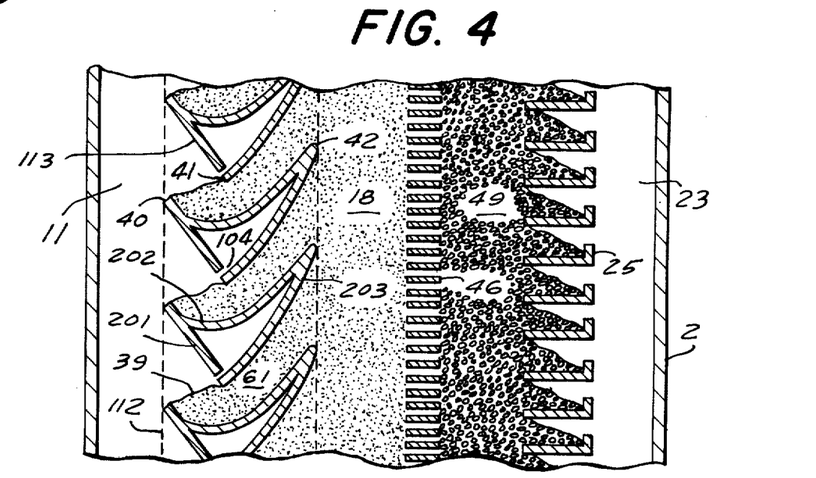
FIG. 4 is a partial section view illustrating an alternative design for the bed support members at the gas entry faces.

FIG. 4 illustrates an alternate design 113 that may sometimes be preferred for the support members of wall 60. Upper, lower, and outer surfaces 202, 203, and 201 respectively enclose a space supplied with a liquid from duct 112. The liquid weeps into a gas entry face 39 from an opening 104 at an edge 41, the outer edge of surface 203. Surfaces 201 and 202 articulate at outer edge joint 40, and surfaces 202 and 203 articulate at inner edge joint 42. Surfaces 202 and 203 incline downwardly and outwardly from edge joint 42, and surface 202 then further inclines upwardly and outwardly toward edge joint 40. The curvature of surface 202 and 203 is gentle, with no pockets where granular material may remain static and not participate in the body movement of material in gas entry portion 61 toward gas entry face 39, or any sharp corners to impede the body movement. As discussed more fully in my aforement co-pending application number 3, "Countercurrent Contacting of Gas and Granular Material in Panel Bed", the arrangement of surfaces 202 and 203 in FIG. 4 will be preferred where countercurrenticity of contacting of gas and granular material in panel bed 1 of the invention is desired.

Figure 6:
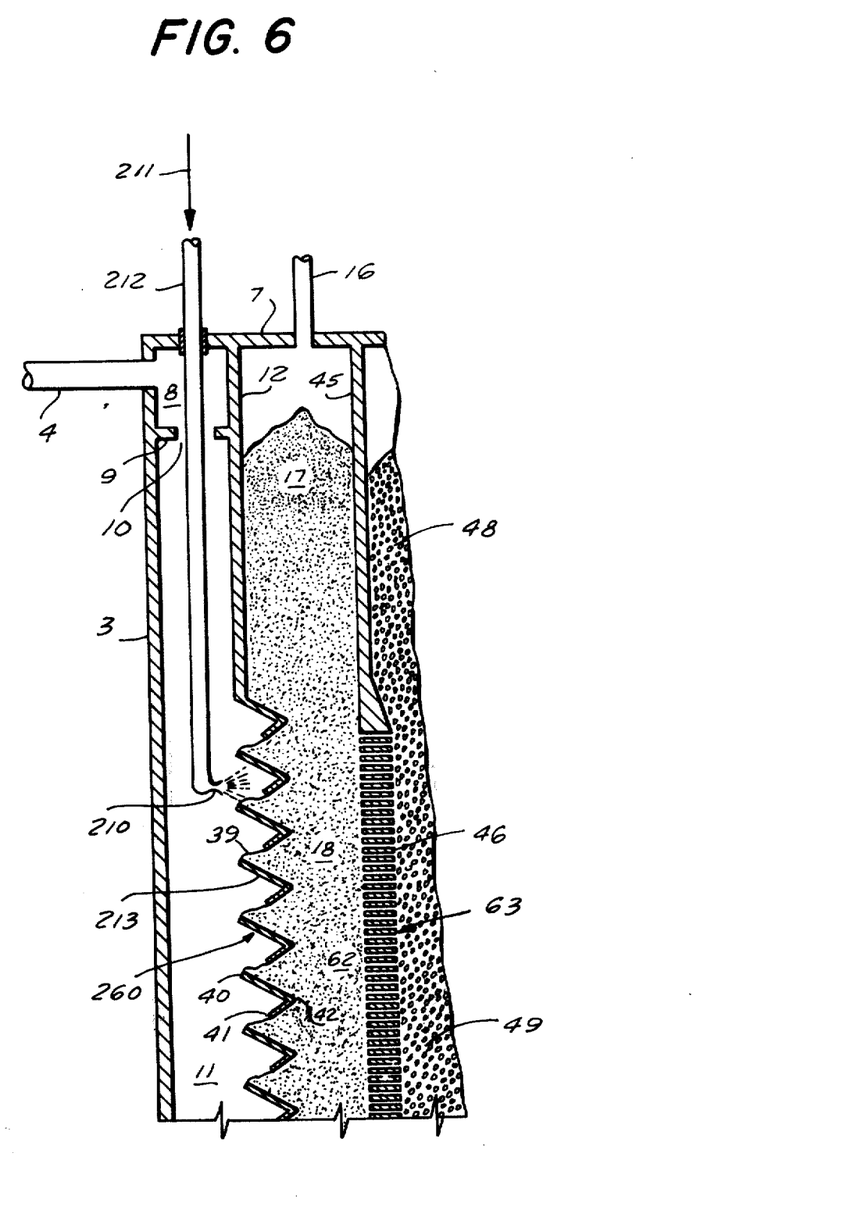
FIG. 6 is an alternative arrangement for providing a wetting liquid to the gas entry faces.

The arrangement of FIG. 6 will be preferred if the liquid contains an appreciable amount of dissolved or suspended solids or is corrosive. Wall 260 is substituted in FIG. 6 for wall 60 of FIG. 1. Support members 213 of wall 260 are identical to support members 13 of wall 60 except for omission of surfaces 101. Duct 112 and pipe 111 are omitted. A plurality of pipes 212 are provided (only one pipe 212 is to be seen in the cross-section view of FIG. 6), supplied with a liquid from source 211 and each fitted with a nozzle 210 to spray the liquid onto gas entry surfaces 39. The pipes are arranged for movement in the vertical direction and also for rotation so that spray nozzles 210 can reach substantially all of gas entry surfaces 39 throughout their extent from wall 51 to wall 52.

An important application of the invention is to filter fly ash from the products of combustion of pulverized coal. Water would advantageously be provided to gas entry faces 39 to improve filtration efficiency or preferably to improve efficiency while supplying to bed 18 a granular material coarser than might otherwise be attractive for use in bed 18 without wetting. Fly ash filtration efficiency is best if a filter cake forms on the gas entry faces so that, shortly after a filtration cycle begins, fly ash is filtered by itself. I have found that a filter cake does not form on dry sand of 10–14 mesh in size (U.S. Standard), but that a filter cake forms readily upon wet sand of this size, affording an advantage over sands of smaller size because the pressure drop across bed 18 is less for the larger sand.

Still larger sand, such as sand of 8–12 mesh, affording even smaller pressure drop in service, can be used effectively if a small amount of a quick-setting cement, normally avoided but here preferred [see Robert F. Blanks and Henry L. Kennedy, "The Technology of Cement and Concrete, Volume I, Concrete Materials", John Wiley, New York, 1955, pages 40–46 and page 72 for a discussion of the setting time of cement and of formulations that set quickly], is added to the combustion products during an early part of a fly ash filtration step, just after a puffback cleaning. Spray nozzles of FIG. 6 would be used to wet surfaces 39 during this early part of the filtration step, as well as later if desired. Presence of the cement in the fly ash deposits as they develop on surfaces 39 would provide a number of weak bonds at at lest a fraction of the points of contact among the fly ash particles, to create a reticulated network of particles of improved coherency.

The liquid supplied from source 211 of FIG. 6 may usefully be chemically absorptive toward sulfur dioxide, so that the invention may be used to remove this gas from combustion products or other industrial waste gases. Suitable liquids are solutions of alkali metal hydroxides or carbonates or sulfites and ammonium hydroxide or carbonate or sulfite. Also suitable are slurries of finely divided slaked lime or finely divided magnesium hydroxide.

A problem in using lime slurries in removing sulfur dioxide from combustion product gases in conventional gas scrubbers has been the disposal of the sludge of calcium sulfate that results. If a lime slurry if supplied from source 211 of FIG. 6 to remove sulfur dioxide from gas in pipe 4, it will be advantageous that the gas be unsaturated in respect to water vapor so that the gas dries out the deposit of lime and its reaction products with sulfur dioxide that accumulates on gas entry faces 39, to provide the products in a form more convenient for disposal.

The procedure for vaporizing water from a solution or suspension of a solid supplied to surfaces 39 has general utility. Each of the aforementioned liquids absorptive in respect to sulfur dioxide might be evaporated to leave a solid residue of reaction product. Large quantities of gases at temperatures between about 200° and 500°F appear in industrial operations, often as waste gases to be discharged to the atmosphere and sometimes requiring cleaning for dust removal or for removal of a noxious chemical species. Often no convenient way has been available to utilize the relatively low-level, low-value heat present in the gases. By the instant invention, the heat in the gases may be employed to dry solutions or slurries or suspensions of waste solids or other solids desired for recovery. The liquid to be evaporated and containing the solid would be sprayed by nozzles 210 onto surfaces 39 of FIG. 6, and a solid residue would appear at these surfaces. The gas should be hot enough so that it is unsaturated in respect to water vapor, and the rate of introduction of the liquid and the rate of flow of the gas should be adjusted so that substantially all of the water can be vaporized by the heat available in the gas. The procedure will leave solid deposits accreted upon the granular material of the gas entry faces 39 and nearby gas entry portions of bed 18.

Sometimes the solid deposits are dense and coherent, and in such cases, it may be advantageous to supply a granular material to bed 18 comprising spherules of the same solid, so that the spherules grow by accretion of additional solid as the abovedescribed method is practiced.

An important application of the method is for concentrating solutions of radioactive waste materials and putting the materials into a solid form, preferably in the form of accreted spherules, for safe disposal into storage that can be kept under longterm observation.

It should be noted that the porosity of granular material bed 18 should be brought initially to the uniform porosity appropriate for the puffback intensity selected for operation, as discussed more fully in the aforementioned application number 1, "Treating Gas and Granular Material in Panel Bed". Specifically, it is advantageous to subject the panel bed initially to a strong puff-back at an intensity exceeding that contemplated for subsequent operations, or to discharge a controlled quantity of granular material from the bottom of panel bed 18.

I do not wish my invention to be limited to the particular embodiments illustrated in the drawings and described above in detail. Other arrangements will be recognized by study of the aforementioned co-pending applications and by those skilled in the art. Gas exit portions 62 of bed 18 may sometimes preferably be retained by an arrangement other than that shown in FIGS. 1 and 4. Suitable arrangements have been disclosed and discussed in my aforementioned co-pending applications, especially 1, 3, and 4. For example, the gas exit portions 62 might be retained by a wire mesh screen; or by combination of a wire screen and a felt cloth; or by a sintered porous ceramic plate; or, if the granular material in bed 18 is sufficiently coarse and the gas velocity into the bed is below that velocity which would carry away the granular material, by a column of widely spaced louvers, such as wall 64. Those skilled in the art will also recognize purposes other than those discussed herein which the invention can advantageously serve.

I claim:

1. A method of contacting gas and a wetted granular material with each other to effect treatment of at least one of the gas and the granular material and a liquid wetting agent, comprising:
    a. arranging granular material in a bed having a plurality of transversely disposed upwardly spaced gas entry portions separated by interposed supporting members having outer and inner edges with respect to the bed wherein said gas entry portions have gas entry faces substantially contiguous with said outer edges and wherein said bed has gas exit portions spaced from said inner edges;
    b. wetting said gas entry faces with a liquid;
    c. forwardly flowing gas in a substantially continuing flow through the gas entry portions of the granular material bed and outwardly from the gas exit portions to effect treatment of one of said gas and said granular material and said liquid;
    d. thereafter causing a transient flow of gas to move in the direction in reverse to the flow of said gas in (c); and
    e. said transient reverse flow producing first a rise and subsequently a fall in the pressure difference between said gas exit portions and said gas entry portions, said rise occurring at a given rate, said difference produced by said transient reverse flow remaining greater than a first critical minimum difference for a non-zero time interval of less than about 150 milliseconds, said first critical difference being that difference at which a steady flow of gas in said reverse direction just produces as localized spill of granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of the granular material toward said gas entry faces to spill a portion of the granular material from the bed; and
    f. supplying fresh granular material to said granular material bed to replace material spilled from said gas entry portions.

2. The method of claim 1 in which said gas contains sulfur dioxide and wherein said liquid contains a constituent causing the liquid to be chemically absorptive toward sulfur dioxide.

3. The method of claim 1 in which said gas is unsaturated in respect to the vapor of said liquid in step (b) and wherein said liquid contains a dissolved solid and wherein the rate of said flow of gas in (c) and the rate of introduction of said liquid in (b) are adjusted so that said liquid vaporizes into said gas increasing the content of vapor in the gas and leaving a solid residue of said dissolved solid deposited upon said granular material of said gas entry faces and portions arranged in step (a).

4. The method of claim 3 in which said dissolved solid is radioactive and wherein the method produces a solid residue of said dissolved solid that is safe for disposal into storage under observation.

5. The method of claim 3 in which said granular material substantially comprises spherules of said dissolved solid having grown upon seed particles by accretion of said residue.

6. The method of treating a gas involving the separation and removal of particulate material by means of a filter of granular material which comprises
    a. arranging the granular material in a filter bed having a plurality of transversely disposed upwardly spaced gas entry portions separated by interposed members having outer and inner edges with respect to the filter bed wherein said gas entry portions have gas entry faces substantially contiguous with said outer edges and wherein said filter bed has gas exit portions spaced from said inner edges;
    b. wetting said gas entry faces with a liquid;
    c. forwardly flowing gas to be treated in a substantially continuing flow during its treatment through the gas entry portions of the granular material bed and outwardly from the gas exit portions to separate and accumulate particulate material at said gas entry faces;
    d. stopping the flow of said gas;
    e. causing a transient flow of gas to move in the direction in reverse to the flow of said gas in (c);
    f. said transient reverse flow producing first a rise and subsequently a fall in the pressure difference between said gas exit portions and said gas entry portions, said rise occurring at a given rate, said difference remaining greater than a first critical minimum difference for a non-zero time interval of less than about 150 milliseconds, said first critical difference being that difference at which a steady flow of gas in said reverse direction just produces a localized spill of granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of the granular material toward said gas entry faces to spill a portion of the granular material and accumulated particulate material from the bed; and g. supplying fresh granular material to said granular material bed to replace material spilled from said gas entry portions.

7. The method of treating a gas involving the removal of sulfur dioxide from the gas and the separation and removal of particulate material by means of a filter of granular material which comprises
   a. arranging granular material in a bed having a plurality of transversely disposed upwardly spaced gas entry portions separated by interposed supporting member having outer and inner edges with respect to the bed wherein said gas entry portions have gas entry faces substantially contiguous with said outer edges and wherein said bed has gas exit portions spaced from said inner edges;
   b. wetting said gas entry faces with a water solution of a first substance or a water suspension of a second substance wherein said first and second substances are chemically reactive toward sulfur dioxide, so that said solution or suspension is chemically absorptive toward sulfur dioxide;
   c. forwardly flowing gas to be treated in a substantially continuing flow during its treatment through the gas entry portions of the granular material bed and outwardly from the gas exit portions to separate and accumulate particulate material at said gas entry faces and to remove sulfur dioxide from the gas;
   d. stopping the flow of said gas;
   e. causing a transient flow of gas to move in the direction in reverse to the flow of said gas in (c);
   f. said transient reverse flow producing first a rise and subsequently a fall in the pressure difference between said gas exit portions and said gas entry portions, said rise occurring at a given rate, said difference remaining greater than a first critical minimum difference for a non-zero time interval of less than about 150 milliseconds, said first critical difference being that difference at which a steady flow of gas in said reverse direction just produces a localized spill of granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of the granular material toward said gas entry faces to spill a portion of the granular material and accumulated particulate material from the bed; and
   g. supplying fresh granular material to said granular material bed to replace material spilled from said gas entry portions.

8. The method of claim 7 in which said second substance of step (b) is selected from the group consisting of finely divided slaked lime and finely divided magnesium hydroxide.

9. The method of claim 7 in which said gas is unsaturated in respect to water vapor over said solution or suspension of step (b) and wherein the rate of flow of gas in (c) and the rate of introduction of said solution or suspension in (b) are adjusted so that water vaporizes into said gas increasing the content of water vapor in the gas and leaving a solid residue of reaction of said first or second substance of step (b) with sulfur dioxide deposited upon said granular material of said gas entry faces and portions arranged in step (a).

10. The method of claim 9 in which the wetting of gas entry faces in step (b) of claim 7 is effected by a water suspension and said second substance of said step (b) is finely divided slaked lime.

11. The method of claim 7 in which said first substance of step (b) is selected from the group consisting of metal hydroxides, alkali metal carbonates, alkali metal sulfites, ammonium hydroxide, ammonium carbonate, and ammonium sulfite.

12. A gas-liquid-solid contactor comprising:
   a pair of upwardly extending horizontally spaced-apart perforate retaining walls;
   a gas inlet compartment adjacent and in communication with perforations of the first of the perforate walls;
   a gas outlet compartment in communication with the perforations of the second of the perforate walls;
   closure means about the space between the first and second perforate walls closing said space against the passage of gas except through the perforations of said perforate walls;
   feed means for supplying a loose solid particulate material into the space between the perforate walls;
   a plurality of support members each adjacent a perforation of said first perforate wall, said support members being arranged to extend outwardly from below their adjacent perforations and into the inlet compartment to support and expose to the inlet compartment a plurality of free surfaces of particulate material, said support members being arranged cooperatively to support the particulate material and retain the material within said space;
   each support member having two surfaces articulated at an edge joint substantially adjacent and below the member's respective perforation;
   the lower of the two surfaces being arranged to extend outwardly and downwardly from said edge joint and into the inlet compartment;
   the upper of the two surfaces being arranged to extend outwardly and upwardly from said edge joint and into the inlet compartment and wherein a line drawn through the outer edge of a said lower surface and the edge joint of the next subjacent member forms an angle less than about 60° from the horizontal;
   each said support member having a third surface lying generally between the outer edges of said upper and lower two surfaces and articulating with said upper surface in an edge joint at said outer edge of said upper surface to form a space enclosed by said upper, lower, and third surfaces of said support member, said space being in communication with said inlet compartment by way of perforations in said lower or said third surface;
   an inlet for admitting a gas into the inlet compartment for passage into the free surfaces and through the particulate material to the outlet compartment;
   means for wetting said free surfaces with a liquid including means for conducting said liquid into said space enclosed by said upper, lower, and third surfaces of each said support member so that the liquid flows through said perforations;
   an outlet for discharging gas from the outlet compartment;
   means for periodically effecting a body movement toward the inlet compartment of at least those portions of the particulate material including said free surfaces and which are retained on said supporting members, said body-movement means comprising means for effecting a transient flow of gas into said outlet compartment and thence across said perforate walls and through said particulate material in said space and from said free surfaces into said inlet compartment to produce first a rise and subsequently a fall in the pressure difference between said outlet compartment and said inlet compartment, said means for effecting said transient flow including a. means for moderating the rate of said rise in said pressure difference, b. means for moderating said transient flow so that said pressure difference remains greater than a first critical minimum difference for a non-zero time interval of less than about 150 milliseconds, said first critical difference being that difference at which a steady flow of gas from said outlet compartment to said inlet compartment just produces a localized spill of granular material from said free surfaces into said inlet compartment, and c. means for moderating said transient flow so that said pressure difference produced by said transient flow peaks to a top value beyond a second critical minimum difference, which is the pressure difference at which a transient flow of gas from said outlet compartment to said inlet compartment producing said pressure difference at said rate of rise just initiates a body movement of the granular material toward said free surfaces to spill a portion of the granular material from said free surfaces; and means for discharging from the inlet compartment material which is spilled thereinto by the body-movement means.

13. A gas-liquid-solid contactor comprising:

a pair of upwardly extending horizontally spaced-apart perforate retaining walls;

a gas inlet compartment adjacent and in communication with perforations of the first of the perforate walls;

a gas outlet compartment in communication with the perforations of the second of the perforate walls;

closure means about the space between the first and second perforate walls closing said space against the passage of gas except through the perforations of said perforate walls;

feed means for supplying a loose solid particulate material into the space between the perforate walls;

a plurality of support members each adjacent a perforation of said first perforate wall, said support members being arranged to extend outwardly from below their adjacent perforations and into the inlet compartment to support and expose to the inlet compartment a plurality of free surfaces of particulate material, said support members being arranged cooperatively to support the particulate material and retain the material within said space;

each support member being arranged to extend outwardly and downwardly in a gentle curve from below its adjacent perforation and then to extend further in a gentle curve upwardly and into the inlet compartment and wherein a surface passed through the inner edge of the gas entry face of a given support member and inclined downwardly and inwardly at an angle of 45° to the horizontal intersects said given support member;

an inlet for admitting a gas into the inlet compartment for passage into the free surfaces and through the particulate material to the outlet compartment;

means for wetting said free surfaces with a liquid;

an outlet for discharging gas from the outlet compartment;

means for periodically effecting a body movement toward the inlet compartment of at least those portions of the particulate material including said free surfaces and which are retained on said supporting members, said body-movement means comprising means for effecting a transient flow of gas into said outlet compartment and thence across said perforate walls and through said particulate material in said space and from said free surfaces into said inlet compartment to produce first a rise and subsequently a fall in the pressure difference between said outlet compartment and said inlet compartment, said means for effecting said transient flow including a. means for moderating the rate of said rise in said pressure difference, b. means for moderating said transient flow so that said pressure difference remains greater than a first critical minimum difference for a non-zero time interval of less than about 150 milliseconds, said first critical difference being that difference at which a steady flow of gas from said outlet compartment to said inlet compartment just produces a localized spill of granular material from said free surfaces into said inlet compartment, and c. means for moderating said transient flow so that said pressure difference produced by said transient flow peaks to a top value beyond a second critical minimum difference, which is the pressure difference at which a transient flow of gas from said outlet compartment to said inlet compartment producing said pressure difference at said rate of rise just initiates a body movement of the granular material toward said free surfaces to spill a portion of the granular material from said free surfaces; and means for discharging from the inlet compartment material which is spilled thereinto by the body-movement means.

14. A gas-liquid-solid contactor comprising:

a pair of upwardly extending horizontally spaced-apart perforate retaining walls;

a gas inlet compartment adjacent and in communication with perforations of the first of the perforate walls;

a gas outlet compartment in communciation with the perforations of the second of the perforate walls;

closure means about the space between the first and second perforate walls closing said space against the passage of gas except through the perforations of said perforate walls;

feed means for supplying a loose solid particulate material into the space between the perforate walls;

a plurality of support members each adjacent a perforation of said first perforate wall, said support members being arranged to extend outwardly from below their adjacent perforations and into the inlet compartment to support and expose to the inlet compartment a plurality of free surfaces of particulate material, said support members being arranged cooperatively to support the particulate material and retain the material within said space;

an inlet for admitting a gas into the inlet compartment for passage into the free surfaces and through the particulate material to the outlet compartment;

a plurality of spray nozzles mounted in said inlet compartment to spray liquid upon said free surfaces;

an outlet for discharging gas from the outlet compartment;

means for periodically effecting a body movement toward the inlet compartment of at least those portions of the particulate material including said free surfaces and which are retained on said supporting members, said body-movement means comprising means for effecting a transient flow of gas into said outlet compartment and thence across said perforate walls and through said particulate material in said space and from said free surfaces into said inlet compartment to produce first a rise and subsequently a fall in the pressure difference between said outlet compartment and said inlet compartment, said means for effecting said transient flow including a. means for moderating the rate of said rise in said pressure difference, b. means for moderating said transient flow so that said pressure difference remains greater than a first critical minimum difference for a non-zero time interval of less than about 150 milliseconds, said first critical difference being that difference at which a steady flow of gas from said outlet compartment to said inlet compartment just produces a localized spill of granular material from said free surfaces into said inlet compartment, and c. means for moderating said transient flow so that said pressure difference produced by said transient flow peaks to a top value beyond a second critical minimum difference, which is the pressure difference at which a transient flow of gas from said outlet compartment to said inlet compartment producing said pressure difference at said rate of rise just initiates a body movement of the granular material toward said free surfaces to spill a portion of the granular material from said free surfaces; and means for discharging from the inlet compartment material which is spilled thereinto by the body-movement means.

* * * * *